Dec. 1, 1970            T. LOEW            3,544,408
METHOD OF MAKING FABRIC COVERED BELTS
Filed Sept. 27, 1967            5 Sheets-Sheet 1
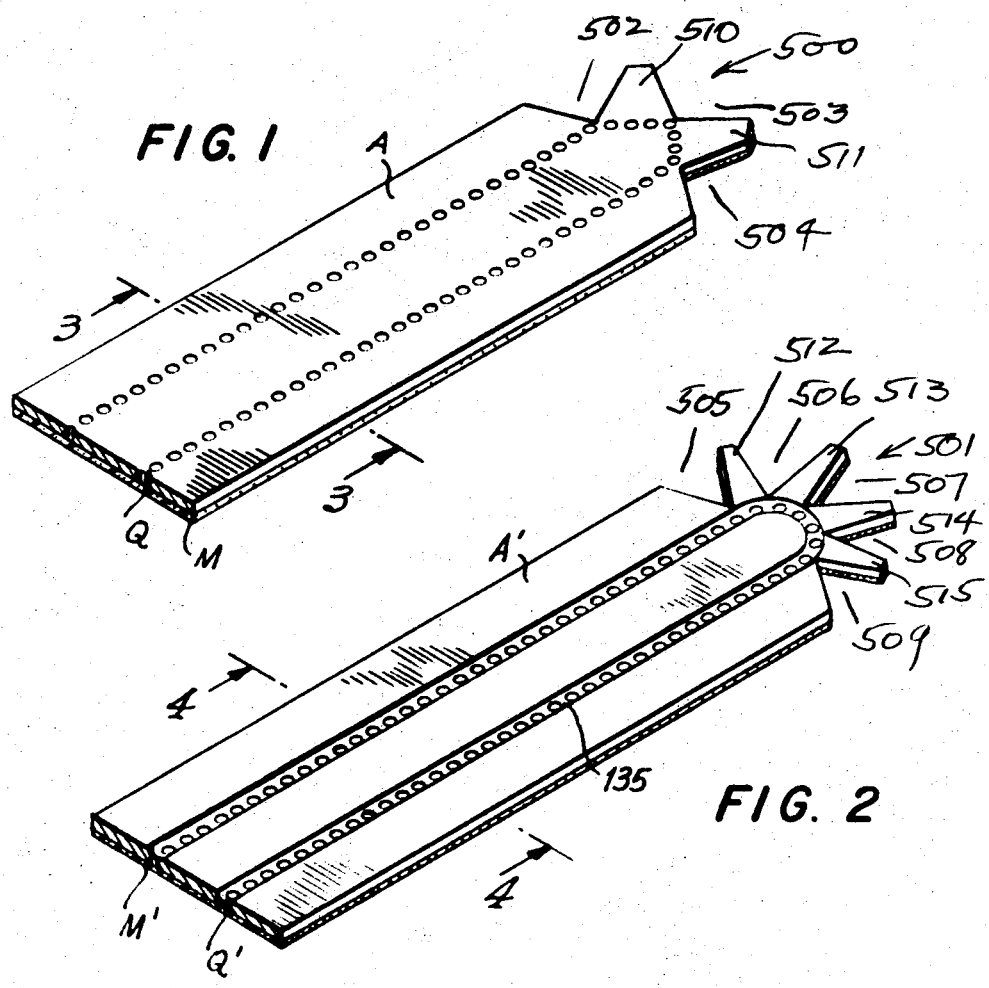
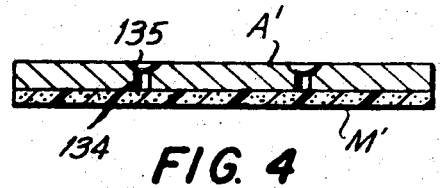
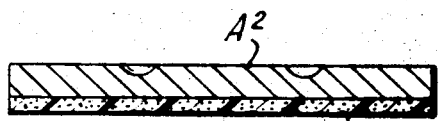
INVENTOR.
THEODORE LOEW
ATTORNEY Dec. 1, 1970 T. LOEW 3,544,408
METHOD OF MAKING FABRIC COVERED BELTS
Filed Sept. 27, 1967 5 Sheets-Sheet 2
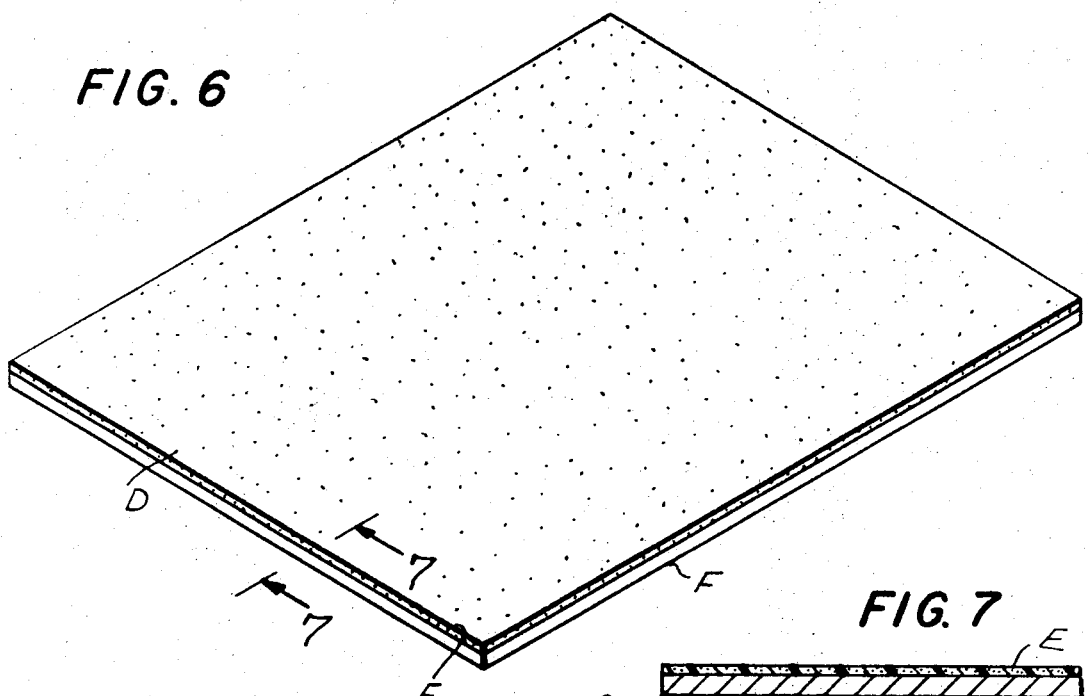
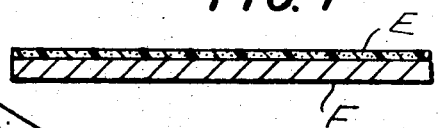
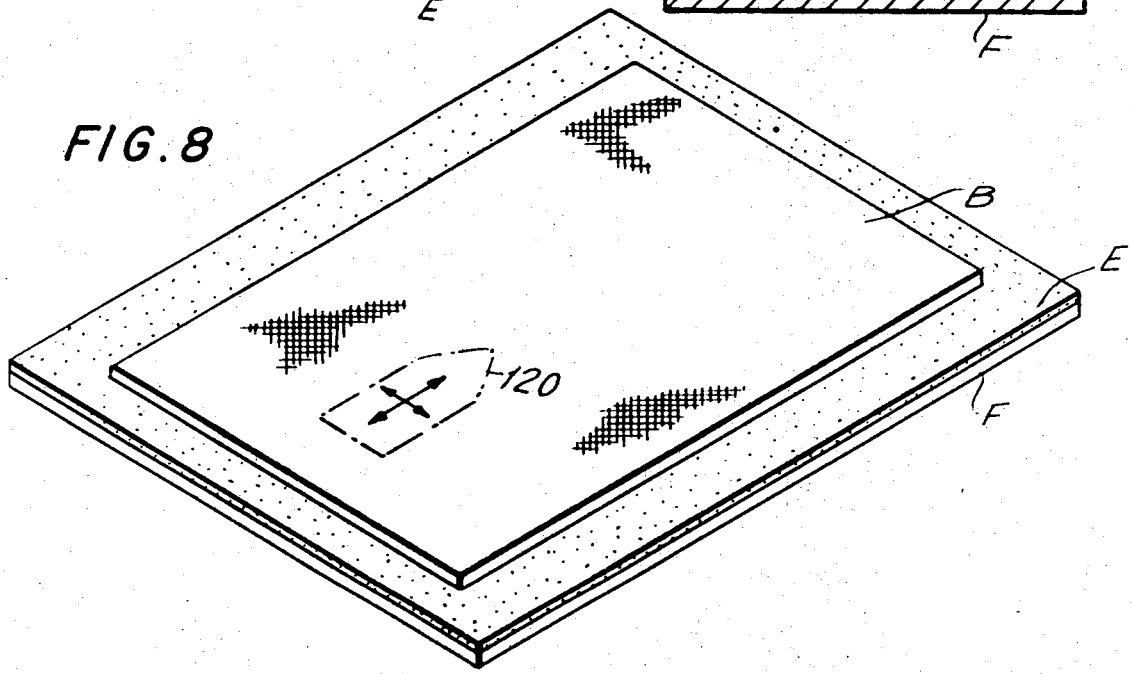
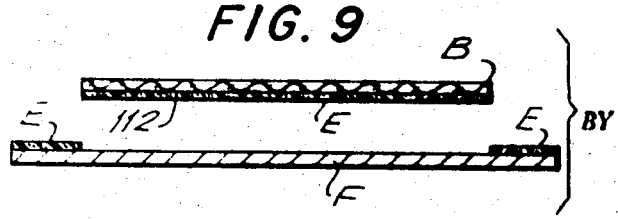
INVENTOR.
THEODORE LOEW
BY
ATTORNEY Dec. 1, 1970 T. LOEW 3,544,408
METHOD OF MAKING FABRIC COVERED BELTS
Filed Sept. 27, 1967 5 Sheets-Sheet 5
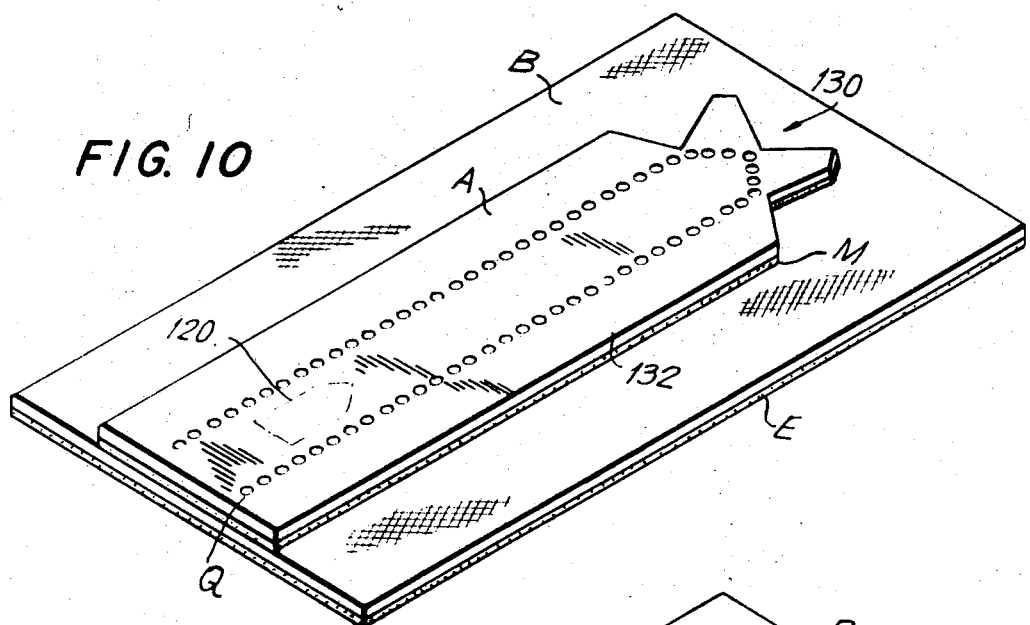
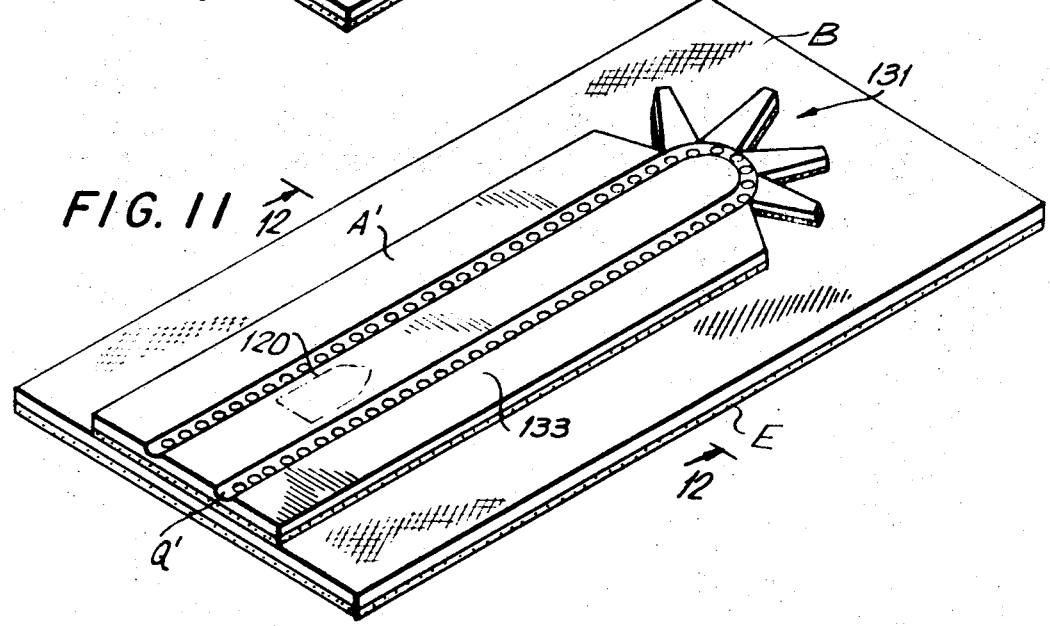
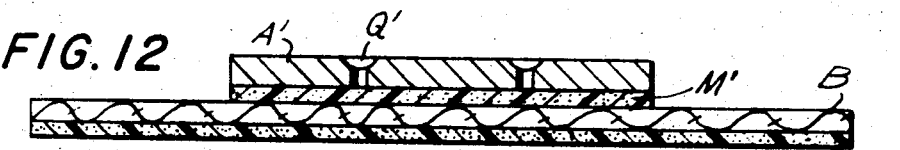
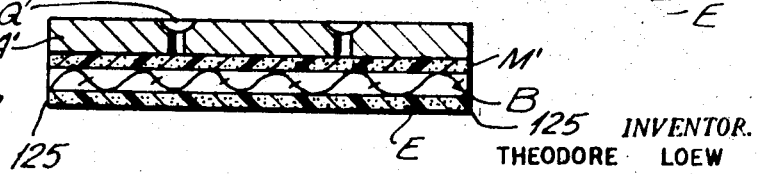
INVENTOR.
THEODORE LOEW
BY
ATTORNEY

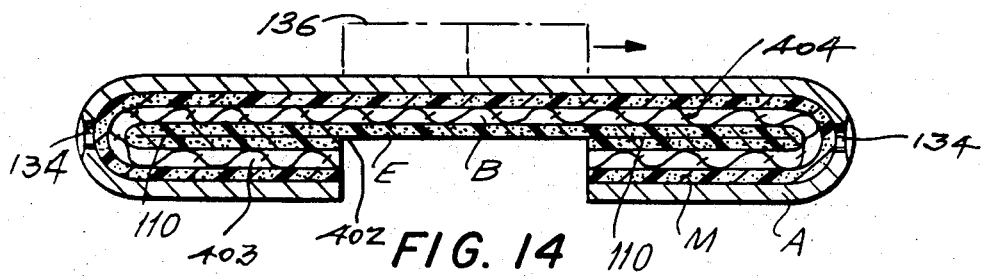
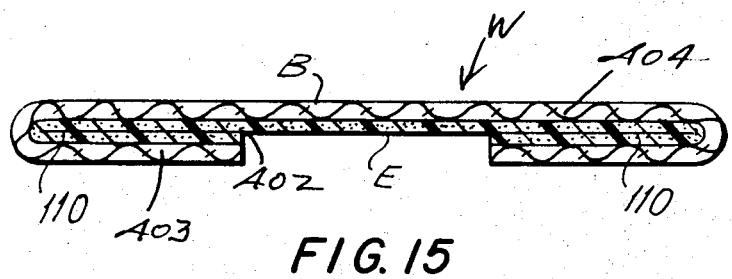
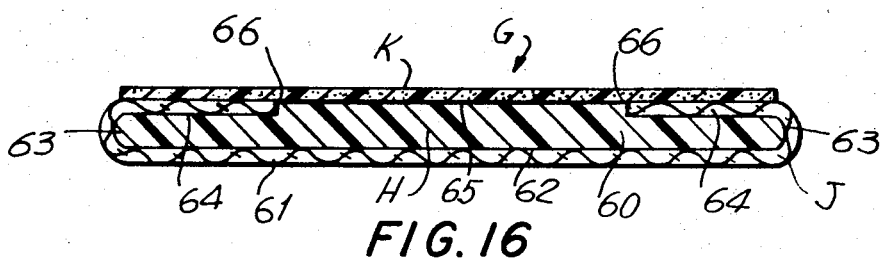
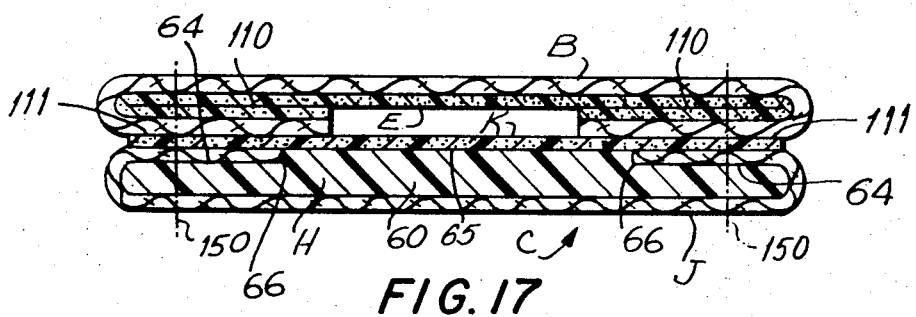

INVENTOR.
THEODORE LOEW

3,544,408
METHOD OF MAKING FABRIC COVERED BELTS

Theodore Loew, Schenectady, N.Y., assignor, by mesne assignments, to The Standard Products Company, a corporation of Ohio
Filed Sept. 27, 1967, Ser. No. 670,842
Int. Cl. B32b 31/00
U.S. Cl. 156—249                                7 Claims

ABSTRACT OF THE DISCLOSURE

The disclosure sets forth a belt end forming method in which a pattern or templet is provided, having cut out side and end flaps to be folded with fabric, which will permit the excess fabric to be removed and eliminate undue lumpiness or thickness at the end of the belt. The pattern is employed in cutting the fabric and folding the side and end flaps. The pattern is separated from the folded fabric which may then be applied to a suitable backing.

---

The present invention particularly relates to a belt forming process and is designed to permit a woman to make fabric covered belts which will match the dress or outer garment with professional skill.

It is among the obects of the present invention to provide a belt making method which will permit a housewife to make fabric covered belts with the fabric matching the dress or outer garment, with relatively few manipulative operations and with or without stitching or sewing and with a resultant belt which will appear to have been professionally made.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects a templet or pattern is provided for forming and shaping the face fabric of the belt which has a temporary adhesive thereon, to which the fabric face may be temporarily adhered.

Desirably an adhesive transfer carrier is employed for transferring a thin layer of a permanent adhesive of resinous thermoplastic material to the facing fabric.

The facing fabric is designed to pick up the permanent thermoplastic adhesive from the release or transfer sheet. Then the backing is provided which is desirably a strip of extruded resinous material of substantially rectangular cross-section, which may be of a thermoplastic such as polyvinyl, polypropylene or polyethylene resin, or even cellulose acetate or cellulose butyrate.

Less preferably, thermoplastic resin impregnated strips may be employed as the belt backing. This belt backing is preferably covered on one side by a fabric which may be the same or different from the facing fabric.

Although the facing fabric may be a woven bias rayon, cotton, wool, linen, Dacron or Orlon fabric, or even a nylon or cellulose acetate fabric, it may also be a knitted fabric or netted fabric or even several layers of a lace fabric. Desirably, where a synthetic fibre is used, it does not constitute more than 50% of the cover fabric for the base fabric which covers the base element or which forms part of the base element.

In the method which is employed, the templet is first provided which is perforated or ridged or grooved along a folded line with the ends cut out so as to conveniently be folded together to form a folded, rounded, or other predetermined belt-end design. This belt-end design is desirably provided with a temporary adhesive light tacky resinous material. Desirably, the fold lines are formed by perforations or by grooving lines or by combinations of both.

A transfer paper or carrier is then provided which has a strong transferable thermoplastic adhesive. This adhesive may be released by means of applying a hot iron to a facing fabric which will pick up the transfer adhesive and retain it on its inside face which is applied against the backing material. The facing cloth or facing fabric carrying the thermoplastic permanent adhesive is then applied to the upper side of the templet or form which carries the temporary adhesive on its face against the fabric. The lower face of the fabric carries the transferred permanent adhesive.

The resultant combination will be a lamination of the templet on top, the temporary adhesive next, on the face of the cloth, upwardly, and the permanent adhesive on the bottom of the cloth.

Then the cloth is cut around the edges of the templet and the templet is then folded inwardly so that the edges are turned in with the templet in closing and being folded upon and around the fabric facing. When a hot iron is applied, the templet will enwrap the inwardly folded fabric facing, the folded edges of which are permanently adhered by means of the permanent adhesive.

Then the templet is stripped off, leaving the cloth facing ready to be applied to the belt backing.

In the meanwhile the belt backing may be formed of extruded thermoplastic resinous material, particularly polyvinyl chloride or polypropylene or polyethylene or polybutylene. Around this base extruded material is applied the backing fabric with the back of the extruded strip being completely covered and with the edges being folded in over the edges of the top of the extruded plastic base.

Then desirably a thin layer of polyvinyl, polyethylene or polypropylene thermoplastic adhesive in strip form is overlaid or positioned on top of the backing strip with its fabric cover.

Finally, the facing strip which has been formed is applied by means of a hot iron to the backing strip and the belt is completed.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a top fragmentary top perspective view of one form of templet or pattern for forming a pointed-end belt.

FIG. 2 is a top perspective view of another form of templet or pattern showing the under adhesive layer which is designed to form a round end.

FIG. 3 is a transverse sectional view upon the line 3—3 of FIG. 1 upon an enlarged scale as compared to FIG. 1.

FIG. 4 is a transverse sectional view upon the line 4—4 of FIG. 2, upon an enlarged scale as compared to FIG. 2.

FIG. 5 is a transverse sectional view of an alternative embodiment similar to FIGS. 3 and 4.

FIG. 6 is a top perspective view of a paper transfer carrier for a transferable thermoplastic adhesive.

FIG. 7 is a transverse edge sectional view taken upon the line 7—7 of FIG. 6 upon an enlarged scale as compared to FIG. 6.

FIG. 8 is a diagrammatic perspective view showing the assembly of a fabric facing and a transfer sheet by means of which the adhesive is transferred to and released onto the fabric facing.

FIG. 9 is a transverse sectional view diagrammatically illustrating the release of the thermoplastic adhesive from the carrier sheet onto the facing cloth, the elements of the view being shown separated.

FIG. 10 is a top perspective diagrammatic view indicating the assembly of the pointed-end templet and the fabric, each carrying their adhesive undercoats.

FIG. 11 is a similar top perspective view showing an alternative form of templet with an undercoat and fabric face with an undercoat.

FIG. 12 is a transverse sectional view of the system or assembly shown in FIG. 11.

FIG. 13 is a transverse sectional view similar to FIG. 12 with the cloth facing now being trimmed to fit the pattern or assembly of FIG. 1 or 2.

FIG. 14 is a transverse sectional view upon an enlarged scale, showing the manner of using the templet to form the belt-end with the portions thereof having been ironed together.

FIG. 15 is a transverse sectional view similar to FIG. 14 but with the templet or pattern removed.

FIG. 16 is a transverse sectional view of the belt backing form with a central extruded base, a plastic cover and a top adhesive layer of a thermoplastic material.

FIG. 17 is a transverse sectional view of the final belt structure.

Figure 18:
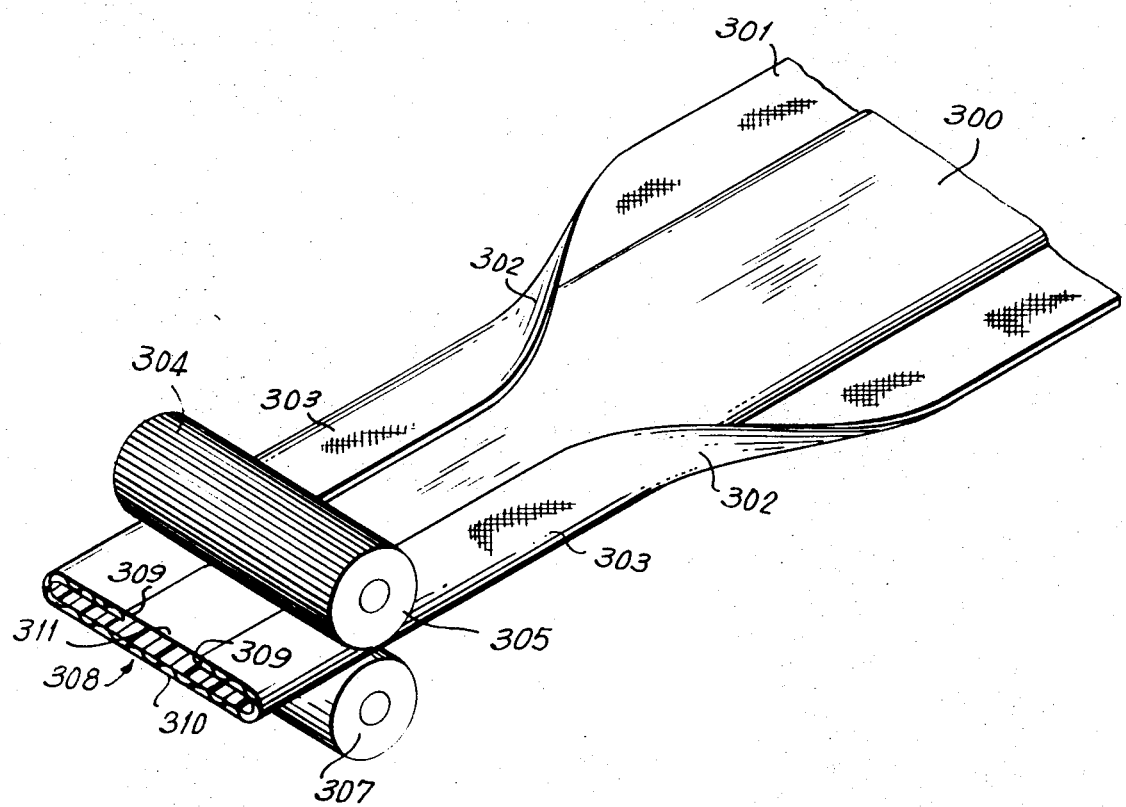
FIG. 18 is a diagrammatic view showing how the fabric facing may be assembled with the thermoplastic core, whether it be of a thermoplastic resin or a foam thermoplastic resin or a fabric impregnated with a thermoplastic resin.

Referring to FIGS. 1 to 9, the templet or pattern A with the fold lines Q and with a temporary adhesive M will form and shape the face fabric B of a belt.

The adhesive transfer carrier D will transfer a thin layer of a permanent adhesive E of resinous thermoplastic material to the facing fabric B shown in FIGS. 6 to 9. The facing fabric B of FIGS. 8 and 9 will pick up the permanent thermoplastic adhesive E from the release or transfer sheet F of FIGS. 6 to 9. The backing G for the belts shown in FIGS. 16 and 17 has an extruded or strip polyvinyl, polypropylene or polyethylene body or base H, a back face or rear fabric J and a polyvinyl chloride, polyethylene or polypropylene adhesive K.

Referring to FIG. 16, the base or core H may be extruded polyvinyl or polyethylene or polypropylene plastic and preferably is a blend of polypropylene (40 to 80% by weight) with a butadiene or butadiene-acrylic (50–50) polymer constituting the balance with an average thickness of about .010 to .020 inch. A woven or knitted fabric 61 is applied to cover the base side 62, the edges 63 and the peripheral top side portions 64 of the opposite side 65 of the bottom side of the base or core H. The fabric edges 66 on the opposite sides may be pinked, but this is not necessary.

The fabric 61 (and also the fabric B) desirably is a woven rayon, cotton, wool, linen, Dacron or Orlon fabric or it may less preferably be a thermoplastic fabric, containing nylon or cellulose acetate, or it may be knitted. The fabric B and 61 may also be applied with the warp extending longitudinally of the axis of the belting without being applied on the bias.

The backing G as shown separately in FIG. 16 desirably has an added thermoplastic adhesive layer K applied by applying a coating or separate strip of a thermoplastic adhesive.

This adhesive may consist of 10 to 40% of polyethylene and less preferably polypropylene, 5 to 20% of chlorinated waxes, such as chlorinated paraffin, chlorinated polyethylene or other chlorinated olefins or unsaturated hydrocarbons having a molecular weight of about 1,000 to 10,000 and the balance of 30 to 50% consisting of terpenes such as chlorinated terpineol and the like. The adhesive K is usually applied in a thickness of 1 to 5 mils.

The combined backing G of FIG. 16 varies from .010 to .050 inch, or preferably .020 to .030 inch in thickness.

FIGS. 14 and 15 respectively illustrate the templet and face fabric B in folded assembly and the face fabric alone in the folded condition. The top or cover fabric element B may vary from a fine crepe de chine to a heavy knit fabric. The removal of the paper templet A from the folded assembly of FIG. 14 will remove the tacky temporary adhesive M. If any adhesive M is left on the folded fabric B it may be readily removed with a damp cloth since it is composed of 50 to 80% of a water soluble form of adhesive such as gum arabic or tragacanth or methyl cellulose or dextrin or pectin or polyvinyl alcohol containing or plasticized with 10 to 30% of sucrose or glucose, or 5 to 10% of glycerine or polyethylene glycol or mannitol or sorbitol or mixtures thereof. With polyvinyl alcohol the plasticizer used should preferably be polyethylene glycol or mannitol or sorbitol in an amount of 5 to 15%.

The selected fabric facing B on its inside face desirably carries the thermoplastic adhesive face and the side edges of the fabric are folded inwardly and sealed to the rear side of the face B.

A hot iron 136 of 300° F. to 400° F. may be used to achieve edge and body sealing of the fabrics B at 110 in FIG. 14, at 111 in FIG. 17 and for the transfer at 112 in FIG. 9.

The core H may be extruded porous or foamed polyvinyl chloride or polyethylene or polypropylene or polybutylene or an acrylobutylstyrene copolymer. These porous or foamed materials are extruded by pressure from heated plastic mixtures of the polyvinyl chloride or polyolefin and amino foaming agents.

The adhesives E attached to the fabric B and at K to base G of FIG. 16 are desirably of the same composition.

The paper carrier A is desirably a glassine or silicone coated release paper onto which the adhesive M may be cast or coated in molten form.

To summarize the operation, the housewife will purchase or be supplied with, or the person making the belt will purchase or be supplied with the templates or pattern A or A', as shown in FIGS. 1 to 5.

Previously these templates or patterns A or A' have been perforated, as indicated at 134 and/or grooved, as indicated at 135, so that they will have fold lines along these perforations or grooves or both.

The portions corresponding to the belt ends or belt points, as indicated at 500 and 501, are formed by making the cutouts 502, 503 and 504 in the case of FIG. 1, or the cutouts 505, 506, 507, 508 and 509 in the case of FIG. 2. These cutouts 502 to 509 are designed to remove sufficient fabric and leave enough fabric at 510 and 511 in FIG. 1 and 512, 513, 514 and 515 in FIG. 2 so that there will be no undue lumpiness or double or triple folding when the belt end or belt point is formed.

The templet or pattern is also proivded with an underlayer of adhesive M or M', which is desirably a light thin layer equal to or less than the thickness of the paper templet consisting of tacky polyvinyl acetate or alcohol or a combination of both. The fabric which is to be employed is also provided with an undersurface of an adhesive and this is accomplished by means of a carrier or transfer sheet shown in FIGS. 6 and 7 which may have a top face as shown in FIGS. 6 and 7 of a transferable permanent adhesive of thermoplastic resinous nature.

The desired adhesive layer should not be thicker than the paper carrier and might be one-half to one-tenth of the thickness of the paper carrier and it usually is made of a combination of polypropylene and/or polyethylene, including equal amounts of chlorinated wax and terpene. As shown in FIG. 7, the adhesive is the top layer but it is designed in FIG. 8 to be transferred as an underlayer to the fabric by means of a hot iron 120.

FIG. 9 is an exploded or separated view showing how the adhesive may be transferred from the transfer paper F on to the fabric B so that the underside of the fabric B will carry the permanent adhesive after it has been ironed in the manner indicated in FIG. 8.

In FIGS. 10 and 11 the respective templets or patterns of FIGS. 1 and 2 have been transferred and laid on top of the fabric which may be woven or knitted and located either on a bias or straight, following which the iron indicated at 120 may be applied. This will cause a union between the temporary adhesive on the underside of the templet or pattern A or A' and the upper face of the fabric which has the permanent adhesive on its underface.

FIG. 12 shows a section from the line 12—12 of FIG. 11 after the ironing operation has taken place, with the fabric B now adhering to the templet A or A' by means of the adhesive layer M or M'.

When the fabric is then cut to the shape of the templet A or A' it will appear as in FIG. 13. Then the union or assembly as indicated at FIG. 14, takes place so that the two inside adhesive layers will be face to face, as indicated at 402, and are ironed together so as to form a permanent union of the folded-in edge 403 and the main upper layer 404 of the fabric.

The fold lines will be along the perforations 134. This will give the top of the belt, after the stripping off of the templet and its temporary underface adhesive M. This separated top is indicated at W in FIG. 15. In the meantime the bottom of the belt has been prepared, as shown in FIG. 16.

This bottom is prepared by first forming an extruded strip H of polyvinyl, polypropylene or polyethylene resin at 350 to 450° F. or using cut strips of sheet nylon, polyvinyl chloride or polyethylene or polypropylene or even using an impregnated strip of a woven or knitted fabric. This fabric may be cellulose acetate or combinations of cellulose acetate, nylon, cotton, wool, linen, or other natural or synthetic fibers, desirably containing between 25 to 50% of thermoplastic strands of cellulose acetate or butyrate or polyvinyl, polyethylene, polypropylene or methyl methacrylate strands, yarns or threads.

This strip is then covered or wrapped on its back and side edges by the woven or knitted fabric 61 and both sides are ironed or pressure rollered so that the inturned edges of the fabric are pressed into and integrated with the top face of the thermoplastic or of the extruded strip.

Then the thin adhesive strip K is postioned on top of the exposed face of the thermoplastic strip H and over the inturned edges, as shown best in FIG. 16.

Finally, the complete belt is assembled by heat and pressure or by ironing, as in FIG. 17.

The belt will stay together without any stitching but stitching is often desirable and lines of optional stitching 150 are indicated in FIG. 17.

In FIG. 18 the belt section 308 is shown being formed between the upper corrugated or roughened face roller 307, which may be heated. The core 300 of a thermoplastic strip or of a thermoplastic foam or of a fabric saturated with thermoplastic with rounded sides may be wrapped with the fabric 301, the sides 302 of which will be folded inwardly by a suitable folder over the top face.

Figure 19:
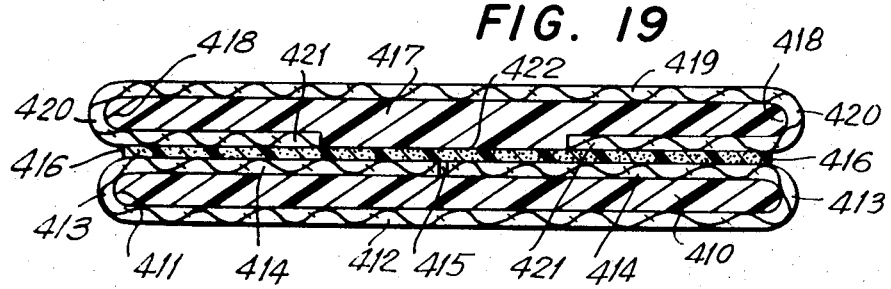
FIG. 19 is a transverse sectional view of two fabric covered thermoplastic cores, positioned back to back, with the split fabric covers being on the inside faces and with the two units being sealed together with a thermoplastic interlining material.

These inturned sides 303 will then be pressed down so that their edges 309 will be embedded in the core 300 and will be flush with the upper face of the core as indicated at 311. The lower face 310 will be the fabric face. To form a final belt, one or two sections 308 may be used, as indicated at FIG. 19. For example, in FIG. 19 the lower belt portion having the core 410 may be covered at the rounded side edges 411 by the fabric 412 which wraps around the side edges as indicated at 413 and extends along the inside face of 414, to the split 415.

The thermoplastic adhesive layer 416 terminates short of the rounded edges 413 and it may serve as an attachment for an upper section which is of similar structure. The upper section will have a core 417 with the rounded edges 418 covered by the fabric 419 which covers the rounded edges as indicated at 420. The inturned edges 421 are embedded into the face 422 of the upper core 417 but sufficient width of the upper core 417 is left exposed so that in itself it may serve as an adhesive attachment to the inturned edges 414 of the layer fabric face 412, with or without the adhesive layer 416.

The preferred thermoplastic material is vinyl chloride polymers, vinylidene chloride polymers and vinyl polymer acetate polymers. Polyethylene or polypropylene is less preferred, and where it is used it should contain ½ to 2% of finely divided silica and ½ to 1% of nitrogens such as guanidines. The thermoplastic materials for coloring purposes may also include 1 to 5% of lamp black, titanium dioxide, chrome green or yellow, monastral red and cyanide blue or green in finely divided form.

The belts produced may be used in connection with ladies wearing apparel or in straps for handbags or for many other purposes for edging or decoration. They may be stitched, if desired, along the edges, although stitching is not necessary.

As many changes could be made in the above method of making fabric covered belts, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed, what is claimed is:

1. A belt end forming method comprising providing a pattern or templet for a belt end having side and end flaps to be folded along predetermined lines with a fabric thereon to form a rounded or pointed end, providing a temporary adhesive on said pattern, applying fabric thereto, providing an adhesive on the underside of said fabric, removing excess portions of said fabric, folding the fabric under the sides and end of the pattern and then removing the pattern to form a folded fabric face.

2. The method of claim 1, said pattern consisting of a strip of paper scored or indented to form fold lines and having cutouts at the ends to guide cutting out of parts of the fabric at the ends to eliminate lumpiness.

3. The method of claim 1, said pattern consisting of a strip of paper scored or indented to form fold lines and having cutouts at the ends to guide cutting out of parts of the fabric to eliminate lumpiness, said temporary adhesive on said pattern being in the form of an underlayer on said paper which enables it to be temporarily attached to the fabric.

4. In the method of claim 1, the use of a transfer carrier sheet having a permanent adhesive thereon for hot iron application to the underside of the fabric.

5. In the method of claim 1, providing a backing consisting of a strip of thermoplastic material having its bottom and side edges covered by fabric, the side edges of the fabric extending inwardly a short distance on top of the plastic strip and bonding said folded fabric face to said backing.

6. In the method of claim 1, providing a backing consisting of a strip of thermoplastic material having its bottom and side edges covered by fabric, providing an additional layer of a thermoplastic adhesive positioned on top of the backing, and applying said folded fabric face against said additional layer of adhesive to join said folded face and backing.

7. The method of claim 1, and providing a fabric covered backing, providing a thermoplastic adhesive between said backing and said fabric face, and then applying heat and pressure to bond said fabric face and backing.

References Cited

UNITED STATES PATENTS

| | | | |
|---|---|---|---|
| 1,963,309 | 6/1934 | Muller | 2—338 |
| 2,411,328 | 11/1946 | MacNab | 2—243UX |
| 2,635,670 | 4/1953 | Winberg | 2—338UX |
| 2,828,796 | 4/1958 | Loew | 2—338 |

REUBEN EPSTEIN, Primary Examiner

U.S. Cl. X.R.

69—21; 2—338; 156—211, 216, 226